(12) United States Patent
Seibold et al.

(10) Patent No.: US 11,850,981 B2
(45) Date of Patent: Dec. 26, 2023

(54) LIGHTWEIGHT CUSHION SUSPENSION AND SEATING SURFACE

(71) Applicant: Adient US LLC, Plymouth, MI (US)

(72) Inventors: Kurt A Seibold, Farmington Hills, MI (US); Jennifer J. Carlson, Ypsilanti, MI (US); Peter James Leite, Plymouth, MI (US); Duane Potes, Adrian, MI (US)

(73) Assignee: Adient US LLC, Plymouth, MI (US)

( * ) Notice: Subject to any disclaimer, the term of this patent is extended or adjusted under 35 U.S.C. 154(b) by 131 days.

(21) Appl. No.: 17/594,734

(22) PCT Filed: Apr. 29, 2020

(86) PCT No.: PCT/EP2020/061916
§ 371 (c)(1),
(2) Date: Oct. 28, 2021

(87) PCT Pub. No.: WO2020/221809
PCT Pub. Date: Nov. 5, 2020

(65) Prior Publication Data
US 2022/0212577 A1 Jul. 7, 2022

Related U.S. Application Data

(60) Provisional application No. 62/840,420, filed on Apr. 30, 2019.

(51) Int. Cl.
*B60N 2/50* (2006.01)
*B60N 2/52* (2006.01)
(Continued)

(52) U.S. Cl.
CPC .............. *B60N 2/502* (2013.01); *B60N 2/52* (2013.01); *B60N 2/542* (2013.01); *B60N 2/546* (2013.01); *B60N 2/686* (2013.01); *B60N 2/7011* (2013.01)

(58) Field of Classification Search
CPC ........ B60N 2/502; B60N 2/7011; B60N 2/52; B60N 2/542; B60N 2/546; B60N 2/686; B60N 2/525
(Continued)

(56) References Cited

U.S. PATENT DOCUMENTS

| 1,811,923 | A | | 8/1927 | Flintermann |
| 6,125,486 | A | * | 10/2000 | Rabon .................... A47C 7/029 297/452.41 |

(Continued)

FOREIGN PATENT DOCUMENTS

| DE | 1020132259 A1 | 6/2015 |
| EP | 0401982 A2 * | 12/1990 |
| EP | 3507134 A1 | 7/2019 |

OTHER PUBLICATIONS

European Patent Office, International Search Report and Written Opinion in Application No. PCT/EP2020/061916, dated Jul. 6, 2020, 9 pages. Rijswijk, Netherlands.

*Primary Examiner* — Milton Nelson, Jr.
(74) *Attorney, Agent, or Firm* — Marshall & Melhorn, LLC (57) ABSTRACT

A cushion suspension for a vehicle seat may have a support structure with a substantially tub-shaped profile and at least two lateral portions. Each of the lateral portions may have a flexible suspension portion. A seating surface assembly for a vehicle seat is also disclosed.

16 Claims, 12 Drawing Sheets

(51) Int. Cl.
*B60N 2/54* (2006.01)
*B60N 2/68* (2006.01)
*B60N 2/70* (2006.01)

(58) Field of Classification Search
USPC .................................................. 297/452.41
See application file for complete search history.

(56) References Cited

U.S. PATENT DOCUMENTS

| | | | |
|---|---|---|---|
| 6,786,544 B1 * | 9/2004 | Muraishi | B60N 2/36 297/452.56 |
| 9,022,475 B2 | 5/2015 | Brncick et al. | |

* cited by examiner

LIGHTWEIGHT CUSHION SUSPENSION AND SEATING SURFACE

BACKGROUND OF THE DISCLOSURE

The present disclosure relates generally to a cushion suspension, in particular a lightweight shell structure, for a vehicle seat. Further, the disclosure relates to a seating surface assembly comprising such a cushion suspension.

Common known cushion suspension, such as a cushion shell structure for a vehicle seat, comprises a metal shell and/or frame structure with foam and trim on top of it providing a seating surface to an occupant. The shell and/or frame comprises lateral, front and rear beams to carry the foam. Further, the cushion suspension comprises a number of spring elements and/or grids which are arranged between the beams and/or in the foam.

SUMMARY OF THE DISCLOSURE

It is an object of the present disclosure to provide an improved cushion suspension, in particular a cushion shell structure and/or metal structure. Further, it is an object of the present disclosure to provide an improved seating surface assembly, in particular a so called A-seating surface assembly, to withstand external, environmental influences. In particular, it is an object of the present disclosure to provide a lightweight cushion suspension and an improved seating surface assembly with a reduced amount of suspension parts, such as springs and/or flexible mats.

According to the lightweight cushion suspension, the object is solved by the features claimed in the claims. According to the improved seating surface assembly, the object is solved by the features claimed in the claims.

According to the disclosure, a cushion suspension for a vehicle seat comprises at least a support structure comprising a substantially tub-shaped, for example u-shaped or w-shaped, profile and at least two lateral portions, wherein each of the lateral portions comprises a flexible suspension portion. The support structure comprises a base portion and at least two lateral portions extending from the base portion.

The flexible suspension portions are configured to allow partially bending of the lateral portions. The flexible suspension portions react to a weight load, for example of an occupant to meet needs of comfortable sitting.

For example, a seating surface element is arranged on the support structure. In particular, the support structure is configured to carry a seating surface element, a foam and/or a trim. The seating surface element is a so called A-surface element. Further, the seating surface element can be configured as a trim element for a cushion and/or foam. The cushion and/or foam can be arranged within a recess of the support structure but is not necessary. The seating surface element is attached to the support structure, in particular in such manner that the seating surface element is substantially stretched over an area of the support structure. For example, the seating surface element is attached to the lateral portions. Particularly, the seating surface element is put in tension providing distribution and deflection, for instance via hammocking behavior.

For example, the disclosure refers to a foamless and/or trim-less suspension device for a vehicle seat. Commonly, foam provides an additional suspension required for the seating surface and provides the passenger with the feeling of comfort. A suspension for comfort feeling to a passenger depends on the foam and/or trim, e.g. foam thickness or layers and/or trim thickness or layers, arranged underneath an A-surface of a vehicle seat. The disclosed suspension device comprises a support structure having a substantially u-shaped body, in particular profile, and at least two lateral portions extending in a vertical direction, wherein each of the lateral portions forms a border that provides bending and compression properties. The support structure can be made of metal and/or plastic material. The support structure is made of lightweight material. Further, the suspension device for a vehicle seat comprises a surface, in particular a seating surface, made of a material which may comprise plastic material such as so called TPU, Hytrel, TPE and/or Polyurea and/or other material which comprises deformable and/or stress relaxation properties. The surface is for example a seating surface element which serves as suspension and A-surface. The seating surface element is substantially stretched or spanned between the lateral portions. For example, the seating surface element is stretched or spanned over the lateral portions, in particular substantially over the flexible suspension portions. Subsequently, there is no need of foam or trim in the seat. The seating surface element is formed, such as pre-formed, to a desired sitting and cushion shape which is then fixed around a perimeter of a frame and/or supporting member and/or the flexible suspension portions. The seating surface element is a pre-formed part, e.g. a molded, in particular an injection molded plastic part. Advantage of the invention is to provide a lightweight and comfortable seating suspension to a passenger whilst the suspension device is durable enough to meet the needs from a safety, comfort and functionality standpoint. For example, the suspension device is used for seats of utility terrain vehicles (UTVs), passenger transport vehicles, vehicles and/or autonomous vehicles. The seating surface element without foam and/or trim, textile or the like provides durable properties against water, mud, sun, dust and other pollutions. Moreover, the seating surface element is easy to clean and comprises dirt-repellent properties.

The flexible suspension portions are configured to allow partially deflection of the lateral portions. For example, the flexible suspension portions are configured to deflect in transverse direction of the vehicle seat. For example, the flexible suspension portions are configured to substantially move in a transverse and/or vertical direction. For example, the flexible suspension portions and/or lateral portions may deform or deflect in any direction of the vehicle seat to adapt to passenger position and movement and/or vehicle movement, vibrations and the like.

According to an embodiment, each of the flexible suspension portions is formed at an upper end of the corresponding lateral portion. For instance, the lateral portion and the flexible suspension portion are made of plastic. The lateral portions are extending substantially straight upward from the base portion, wherein the flexible suspension portion is arranged on the upper end of the corresponding lateral portion.

For example, each flexible suspension portion extends substantially perpendicular from the corresponding lateral portion. For example, each flexible suspension portion extends substantially perpendicular from the corresponding upper end of the lateral portion.

The lateral portions and/or flexible suspension portions can provide attachment areas for the seating surface element. For example, the seating surface element is fastened to the lateral portions and/or flexible suspension portions by means of fastener elements or built in features, such as clips, channels, snap-in features, locking elements or the like. For example, each lateral portion comprises an attachment device to attach the seating surface element to the support structure.

According to another embodiment, each flexible suspension portion comprises a retaining channel and a tube portion which is arranged in the retaining channel. Particularly, the flexible suspension portions are configured as borders which support bending and compression behavior to meet the needs of sitting by putting the A-surface in tension and providing distribution and deflection via hammocking behavior.

According to a further embodiment, the tube portions are filled with a medium, wherein the tube portions are configured to be adjusted by modifying a quantity of the medium. For example, the tube portions are configured as tire elements and/or inner tubes/tires. The tube portions may be bladders that take on a completely different shape, not limited to a circular tube. In particular, a pressure in the tube or bladder portions can be modified to change a suspension feel of the support structure either at production level or by an end user through an access device to the tube or bladder portions. For example, the tube or bladder portions are part of a one-piece tire element, in particular a continuous tire element, such as a bike tire or continuous bladder. The tube portions and/or tire element can be adjusted in flexibility and hardness by modifying the pressure via supplying more or less medium, such as air, into the tube portions and/or tire element. For example, the access device comprises a stem and/or a valve. Moreover, a controlling of rate on deflection is enabled by means of the tube portions and/or the tire element. Bladders can also be used on the backrest to control an amount of support in a lumbar region of the seat, so the occupant can control the support for the back as they deflect into the seat.

Additional foam bolsters and pads can be added to the back cushion and seat cushion if additional lateral support and occupant hold is desired but is not a requirement. For example, a number of separate bolster pads and an insert pad per cushion may be attached to the A-surface formed plastic seating surface via a removable attachment or adhesive. To maintain a complete weather-proof option closed cell foam, so called EVA (Ethylene-vinyl acetate) material and/or molded foam may be used for the separate components.

In another embodiment, the support structure comprises a front portion and a rear portion which are each coupled to the lateral portions. For instance, the support structure is formed as a one-piece part, wherein the front, rear and lateral portions are configured as continuous side portions. The front and rear portions are extending upwards from the base portion.

In a further embodiment, the front portion and the rear portion each comprises a flexible suspension portion having a retaining channel and a tube portion which is arranged in the retaining channel.

Further, the disclosure relates to a seating surface assembly for a vehicle seat, comprising at least a lightweight cushion suspension as described above, and a seating surface element which is fixed around a perimeter of the support structure. For example, the seating surface element is fixed around a perimeter of each front, rear and lateral portion. In particular, the seating surface element is bent over the tube portion and fixed around each perimeter of the corresponding flexible suspension portion. The seating surface element is bendable over each tube portion. The tube portions and/or the tire element are configured to maximize deflection while controlling stress critical of weight load.

According to an embodiment, the seating surface element is made of plastic material, such as thermoplastic material. For example, the seating surface element is made of so called TPU, Hytrel or Polyurea or any other plastic material. In particular, an A-surface of the seating surface element is made of plastic, such as thermoplastic material. The seating surface element is configured to serve as suspension and A-surface material. Subsequently a foam or trim is not needed. In particular, the seating surface element provides comparatively better resistance to external, environmental influences such as water, mud, sun and dust. The seating surface element is easy to clean. Further, the seating surface element comprises a flexibility and stability to be put in tension and providing distribution and deflection via hammocking behavior on the support structure. The seating surface element is fastened to the support structure substantially in tension. The support structure may be a molded part, e.g. an injection molded part. The flexible suspension portions may be attached or unitary formed on the lateral portions of the support structure.

The seating surface assembly comprises a suspension device having a support structure and a seating surface element, both when attached together create a high suspension and comfortable seating surface.

It is possible to arrange a cushion and/or foam within a recess of the support structure but not necessary.

For example, the seating surface assembly is applicable in automotive seating as well as in open air utility vehicles, all-terrain vehicles and transport vehicles.

The seating surface assembly provides a lightweight seat system whilst providing improved driver performance and control as well as durability in its intended environment.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
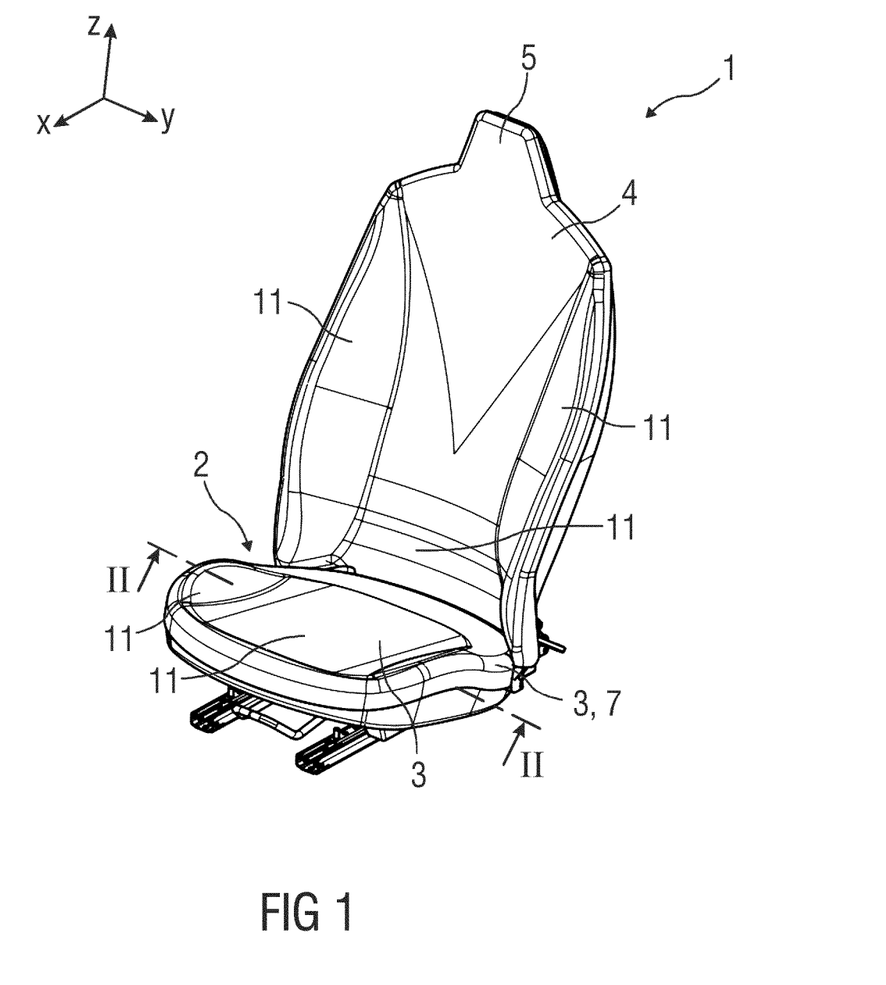
FIG. 1 shows an embodiment of a vehicle seat comprising a seating surface assembly.

FIG. 1 shows an embodiment of a vehicle seat 1 comprising a seating surface assembly 2.

For a better understanding of subsequent descriptions of the seat 1 a coordinate system is shown in further figures. The coordinate system comprises a longitudinal axis x, a transverse axis y and a vertical axis z in relation to the seat 1.

The seat 1 comprises at least a seat pan 3 and a back-rest 4. Optionally additional, the seat 1 comprises a headrest 5. For example, the back-rest 4 is adjustable relatively to the seat pan 3. In particular, the back-rest 4 is pivotable coupled to the seat pan 3 in a pivot axis.

Figure 2:
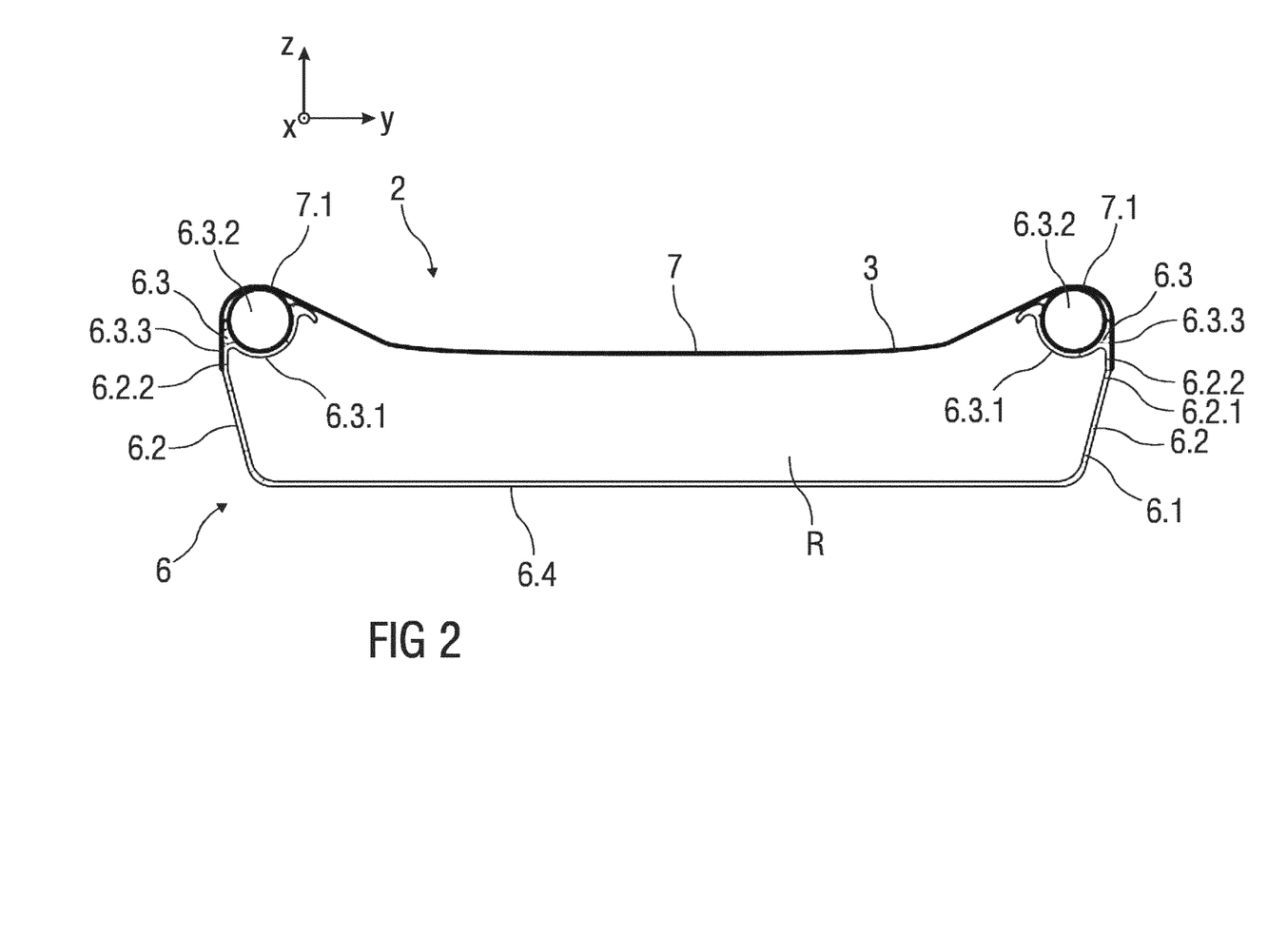
FIG. 2 shows a sectional view of the seating surface assembly.

FIG. 2 shows a sectional view of the seating surface assembly 2.

The seating surface assembly 2 comprises a lightweight cushion suspension 6, such as a support structure for the seat pan 3. Further, the seating surface assembly 2 is configured as a support structure of the back-rest 4.

Further, the seating surface assembly 2 comprises a seating surface element 7 which is arranged on the lightweight cushion suspension 6. The seating surface element 7 is formed to a desired cushion shape and is fixed to the lightweight cushion suspension 6. The seating surface element 7 is made of plastic material, such as thermoplastic material. For example, the seating surface element 7 is made of so called TPU (Hytrel or similar), TPE or Polyurea or any other plastic material. In particular, an A-surface (facing towards an occupant) of the seating surface element 7 is made of plastic, such as thermoplastic material. The seating surface element 7 is configured to serve as suspension and A-surface material. For instance, the seating surface element 7 serves directly as seat pan 3. Subsequently a foam or trim is not needed. In particular, the seating surface element 7 provides comparatively better resistance to external, environmental influences such as water, mud, sun and dust. Further, the seating surface element 7 comprises a flexibility and stability to be put in tension and providing distribution and deflection via hammocking behavior. For example, a number of additional foam elements 11, such as bolsters and/or pads, can be added to the backrest 4 and/or to the seat pan 3. As shown in FIG. 1, one or more foam elements 11 are arranged on the seating surface element 7. If additional lateral support and occupant hold is desired one or more separate foam elements 11, such as bolsters and/or pads, and an insert pad per cushion could be attached to the A-surface formed plastic seating surface element 7 and also to the backrest 4 via a removable attachment or adhesive. To maintain a complete weather-proof option closed cell foam, EVA or molded foam would be used for the separate components.

The lightweight cushion suspension 6 comprises at least a support structure 6.1 comprising a substantially u-shaped profile and at least two lateral portions 6.2, wherein each of the lateral portions 6.2 comprises a flexible suspension portion 6.3. The support structure 6.1 comprises a base portion 6.4 and at least two lateral portions 6.2 extending from the base portion 6.4. The support structure 6.1 is made of metal and/or plastic. For example, the support structure 6.1 is configured as a one-piece component.

The flexible suspension portions 6.3 are configured to allow partially bending of the lateral portions 6.2. The flexible suspension portions 6.3 react to a weight load, for example of an occupant to meet needs of comfortable sitting. For example, each flexible suspension portion 6.3 and the corresponding lateral portion 6.2 are configured as one-piece side of the support structure 6.1.

For example, the seating surface element 7 is arranged on the support structure 6.1. The seating surface element 7 is a so called A-surface element. Further, the seating surface element 7 can be configured as a trim element for a cushion and/or foam. The cushion and/or foam can be arranged within a recess R of the support structure 6.1 but is not necessary. The seating surface element 7 is attached to the support structure 6.1, in particular in such manner that the seating surface element 7 is substantially stretched over an area of the support structure 6.1. For example, the seating surface element 7 is attached to the lateral portions 6.2. Particularly, the seating surface element 7 is put in tension providing distribution and deflection, for instance via hammocking behavior due to the design of the support structure 6.1.

The flexible suspension portions 6.3 are configured to allow partially deflection of the lateral portions 6.2. For example, the flexible suspension portions 6.3 are configured to deflect in transverse direction of the vehicle seat 1.

Each of the flexible suspension portions 6.3 is formed at an upper end 6.2.1 of the corresponding lateral portion 6.2. For instance, the lateral portion 6.2 and the flexible suspension portion 6.3 are made of plastic. The lateral portions 6.2 are extending substantially straight upward from the base portion 6.4, wherein the flexible suspension portion 6.3 is arranged on the upper end 6.2.1 of the corresponding lateral portion 6.2.

Figure 4A:
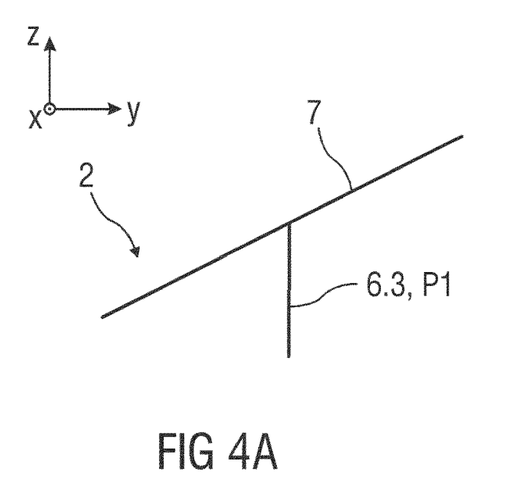
FIG. 4A shows schematically bending behaviors of the seating surface assembly.

Each flexible suspension portion 6.3 comprises a retaining channel 6.3.1 and a tube portion 6.3.2 which is arranged in the retaining channel 6.3.1. It is to be understood that the tube portion 6.3.2 can also be a bladder portion or any other medium filled or fillable element. The tube portion 6.3.2 can be of any shape, e.g. circular shape, rectangular shape, more or less inflated or filled and therefore thicker or thinner etc. The tube portion 6.3.2 may react to load and movement of the passenger. Particularly, the flexible suspension portions 6.3 are configured as borders which provide bending and compression behavior to meet the needs of sitting by putting the seating surface element 7 in tension and providing distribution and deflection via a hammocking behavior. In particular, each tube portion 6.3.2 is configured as border providing the bending and the compression behavior. The flexible suspension portions 6.3 are bendable in the transverse direction of the seat 1. When an occupant is sitting on the seating surface element 7, the flexible suspension portions 6.3 are bent inwardly, particularly in a direction of the recess R. Thereby, the seating surface element 7 provides a comfortable sitting feeling via hammocking behavior to the occupant. When the occupant leaves the seat 1, the flexible suspension portions 6.3 are put back into an initial position P1, as shown in FIG. 4A. That means that the flexible suspension portions 6.3 are substantially bent outwardly again. The seating surface element 7 is put in a more tensed position such that when the occupant takes a seat on the seat pan 3 the flexible suspension portions 6.3 are bent inwardly following the weight load and motion of the occupant.

Figure 4B:
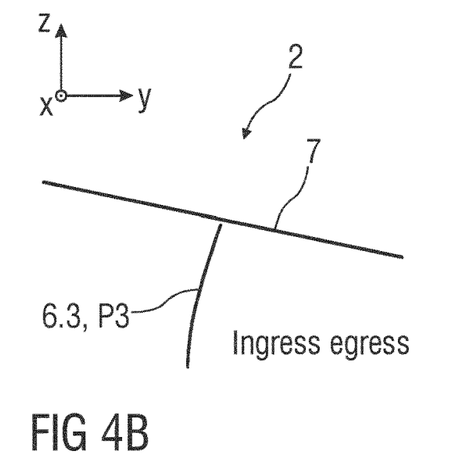
FIG. 4B shows schematically bending behaviors of the seating surface assembly.
Figure 4C:
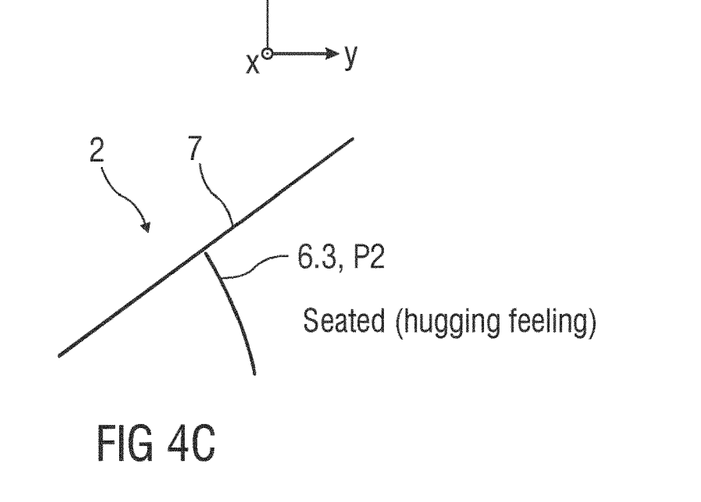
FIG. 4C shows schematically bending behaviors of the seating surface assembly.

Thereby, the seating surface element 7 is put in a hammocking position P2, as shown in FIG. 4B. Furthermore, the flexible suspension portions 6.3 are configured to simplify an egress and ingress, wherein the flexible suspension portions 6.3 are bendable outwardly beyond the initial position P1. An egress and ingress position P3 is shown in FIG. 4C.

Alternatively, the flexible suspension portions 6.3 can comprise a substantially L-shape in a not shown embodiment.

The lateral portions 6.2 can provide attachment areas 6.2.2 for the seating surface element 7. For example, the seating surface element 7 is fastened to the lateral portions 6.2 by means of fastener elements or built in features, such as clips. In particular, the seating surface element 7 comprises two bent portions 7.1 which are arranged partially surrounding the flexible suspension portion 6.3 and fixed around a perimeter 6.3.3 of the corresponding lateral portion 6.2.

The tube portions 6.3.2 are filled with a medium, such as air, wherein the tube portions 6.3.2 are configured to be adjusted by modifying a quantity of the medium. For example, the tube portions 6.3.2 are configured as tire portions and/or inner tubes. In particular, a pressure in the tube portions 6.3.2 can be modified to change a suspension feel of the support structure 6.1 either at production level or by an end user through an access device to the tube portions 6.3.2. For example, the tube portions 6.3.2 are part of a one-piece tire element, in particular a continuous tire element, such as a bike tire. The tube portions 6.3.2 and/or tire element can be adjusted in flexibility and hardness by modifying the pressure via supplying more or less medium, such as air, into the tube portions 6.3.2 and/or tire element.

In a further embodiment, the flexible suspension portions 6.3 comprise a standing flange or multiple standing flanges allowing controlled rates for fore and aft as well as side to side deflection and tuning compression for ingress and egress.

Figure 3:
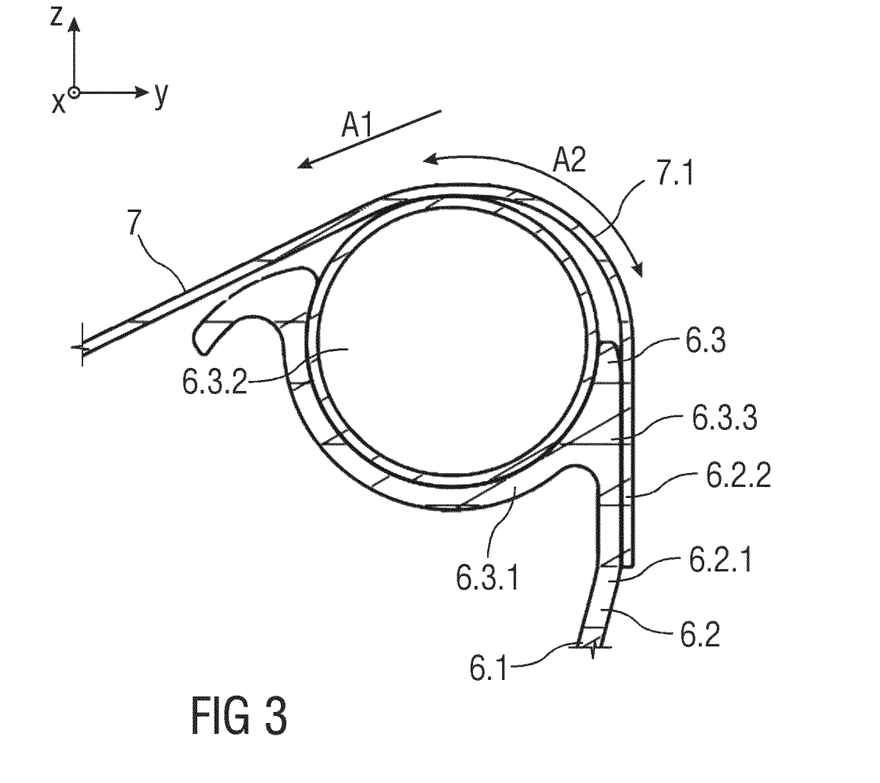
FIG. 3 shows an enlarged view of an area of the seating surface assembly according to FIG. 2.

FIG. 3 shows an enlarged view of an area of the seating surface assembly 2 according to FIG. 2. In particular, FIG. 3 shows an enlarged view of one of the flexible suspension portions 6.3 of the support structure 6.1. The arrow A1 shows a possible force put on the seating surface element 7, for instance by an occupant taking a seat, wherein the flexible suspension portion 6.3 deflects in an inward direction. The arrow A2 shows possible bending directions of the flexible suspension portion 6.3. In particular, the flexible suspension portion 6.3 is bendable in the transverse direction of the seat 1.

FIGS. 4A to 4C show each schematically bending behaviors of the seating surface assembly 2. In particular, FIG. 4A shows the flexible suspension portion 6.3 in an initial position P1, FIG. 4B shows the flexible suspension portion 6.3 in an egress and ingress position P3 and FIG. 4C shows the flexible suspension portion 6.3 in a hammocking position P2. The shown flexible suspension portion 6.3 is configured as border which provides bending and compression behavior to meet the needs of sitting by putting the seating surface element 7 in tension and providing distribution and deflection via a hammocking behavior. When an occupant is sitting on the seating surface element 7, the flexible suspension portion 6.3 is bent inwardly (from the initial position P1 to the hammocking position P2). Thereby, the seating surface element 7 provides a comfortable sitting feeling via hammocking behavior to the occupant. When the occupant leaves the seat 1, the flexible suspension portions 6.3 are put back into the initial position P1. That means that the flexible suspension portions 6.3 are substantially bent outwardly again. The seating surface element 7 is put in a more tensed position such that when the occupant takes a seat on the seat pan 3 the flexible suspension portions 6.3 are bent inwardly following the weight load and motion of the occupant. Thereby, the seating surface element 7 is put in the hammocking position P2. Furthermore, the flexible suspension portions 6.3 are configured to simplify an egress and ingress, wherein the flexible suspension portions 6.3 are bendable outwardly beyond the initial position P1.

Figure 5:
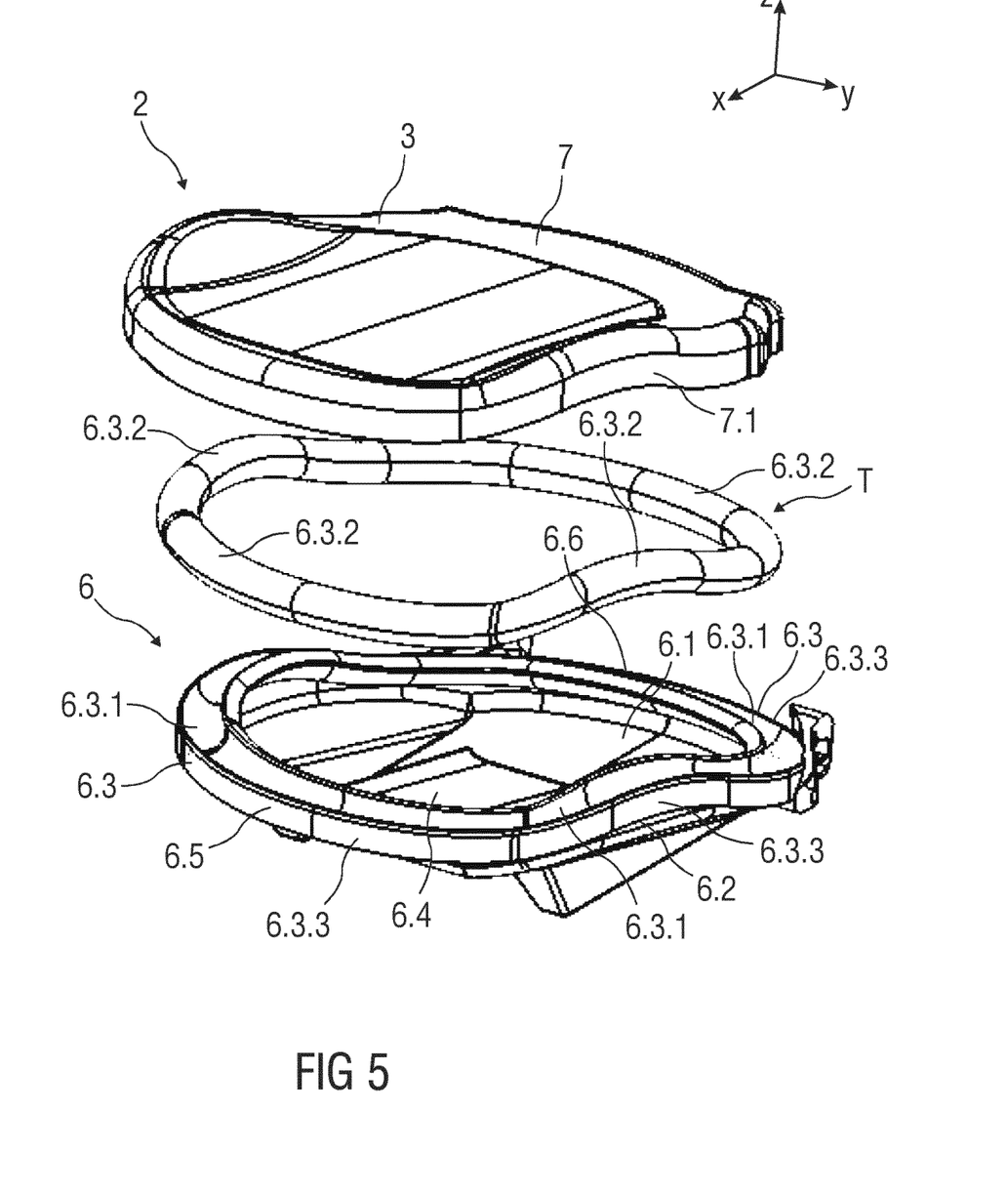
FIG. 5 shows an embodiment of a seat pan structure.

FIG. 5 shows an embodiment of a seat pan structure. The support structure 6.1 comprises a front portion 6.5 and a rear portion 6.6 which are each coupled to the lateral portions 6.2. For instance, the support structure 6.1 is formed as a one-piece part, wherein the front, rear and lateral portions 6.2, 6.5, 6.6 are configured as continuous side portions. The front and rear portions 6.5, 6.6 are extending upwards from the base portion. For example, the front portion 6.5 and the rear portion 6.6 each comprises a flexible suspension portion 6.3 having a retaining channel 6.3.1 and a tube portion 6.3.2 which is arranged in the retaining channel 6.3.1. For example, the retaining channel 6.3.1 of each rear, front and lateral portion 6.6, 6.5, 6.2 is configured as a continuous running channel in which a one-piece tire element comprising each tube portion 6.3.2 is arranged. The tube portions 6.3.2 are each part of a one-piece element T. Thereby, a manufacturing and assembly of the support structure 6.1 is simplified.

Alternatively or additionally, the retaining channels 6.3.1 are created to receive a number of pneumatic support bladders providing adjustment to the seating surface element 7.

The seating surface element 7 is fixed around a perimeter 6.3.3 of the support structure 6.1. For example, the seating surface element 7 is fixed around a perimeter 6.3.3 of each front, rear and lateral portion 6.5, 6.6, 6.2.

Figure 6:
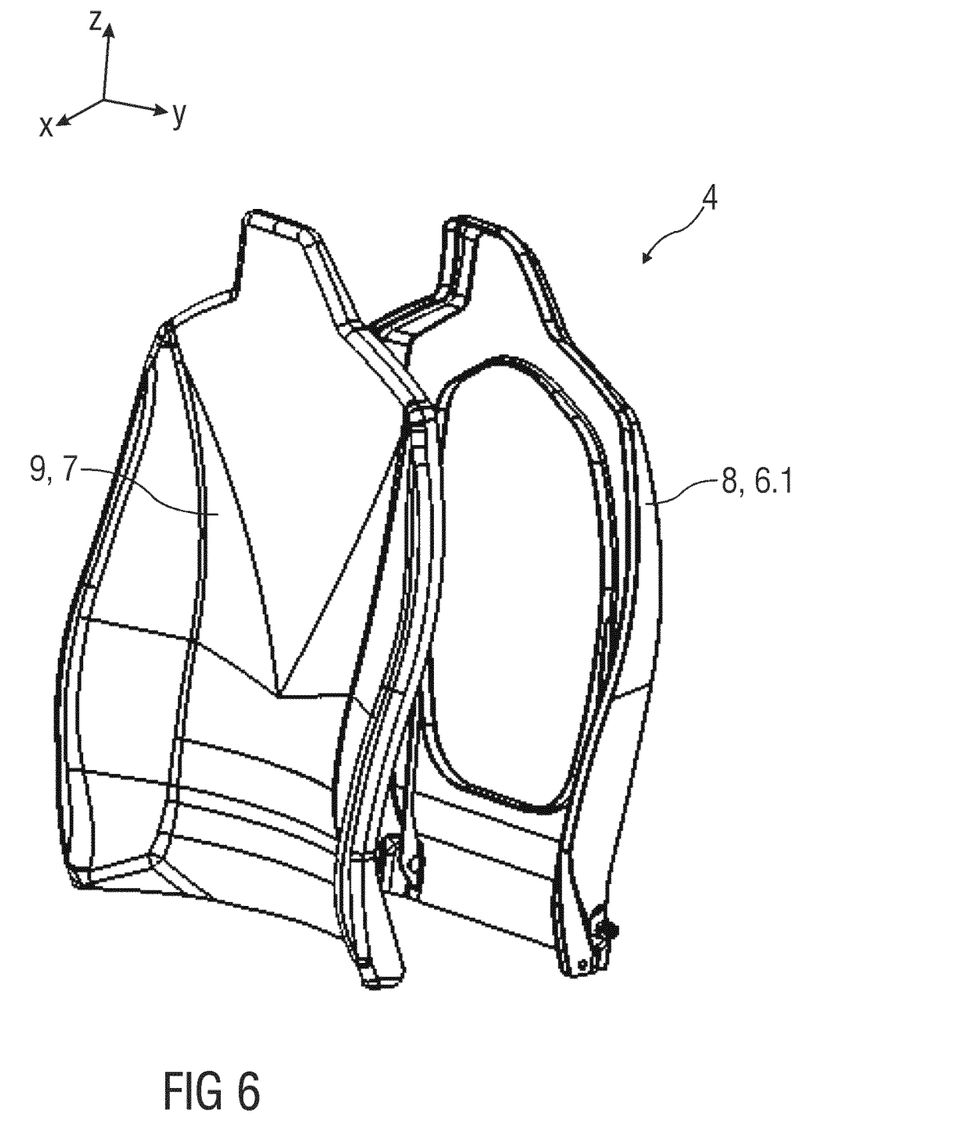
FIG. 6 shows an embodiment of a back-rest structure.

FIG. 6 shows an embodiment of a back-rest structure having a back panel shell 8 and a cushion panel 9. For example, the back panel shell 8 can be configured as a former described support structure 6.1 and the cushion panel 9 can be configured as a former described seating surface element 7.

Figure 7A:
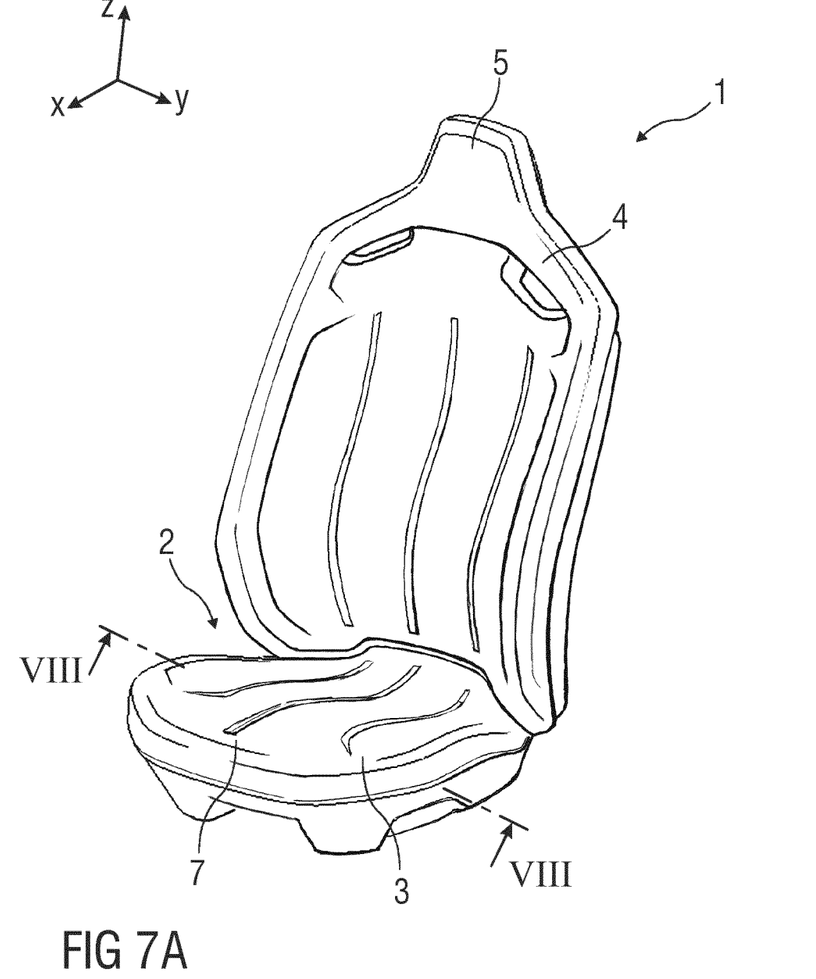
FIG. 7A shows in a perspective view an embodiment of a vehicle seat.
Figure 7B:
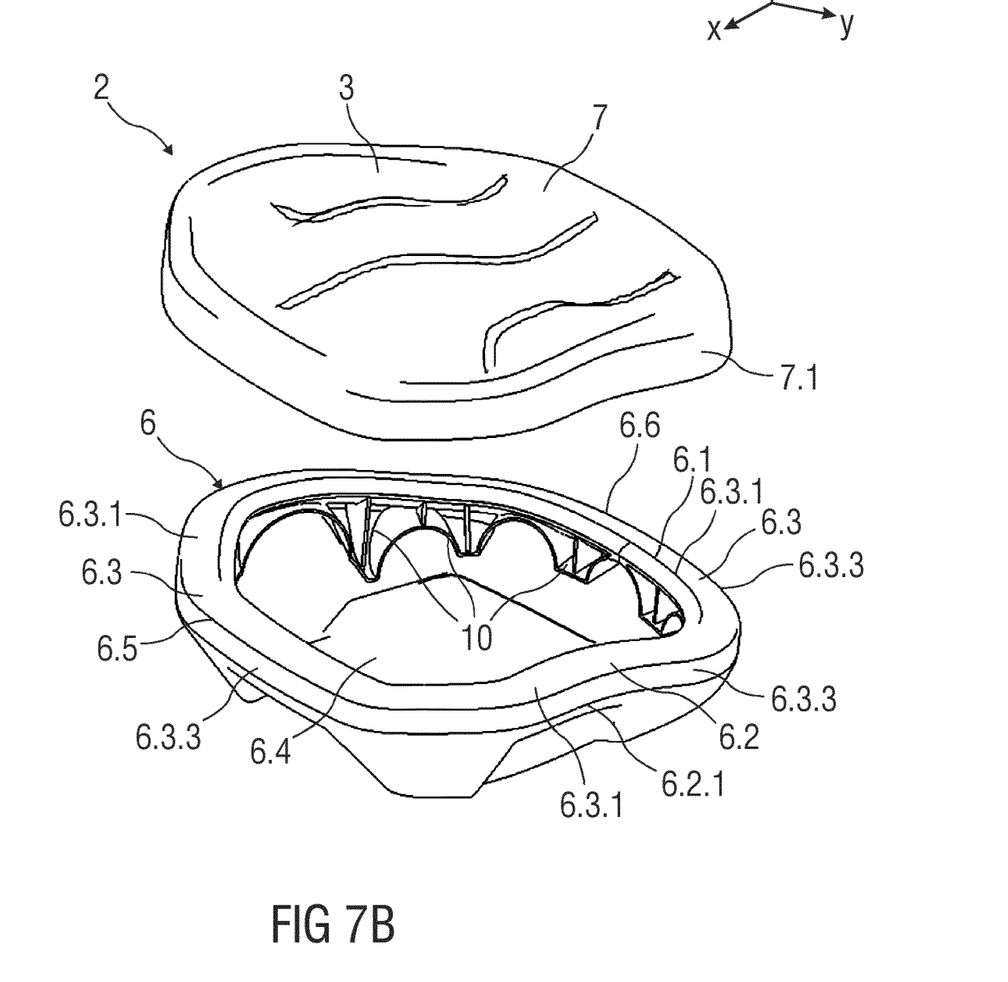
FIG. 7B shows in a perspective view an embodiment of a seat pan structure.
Figure 7C:
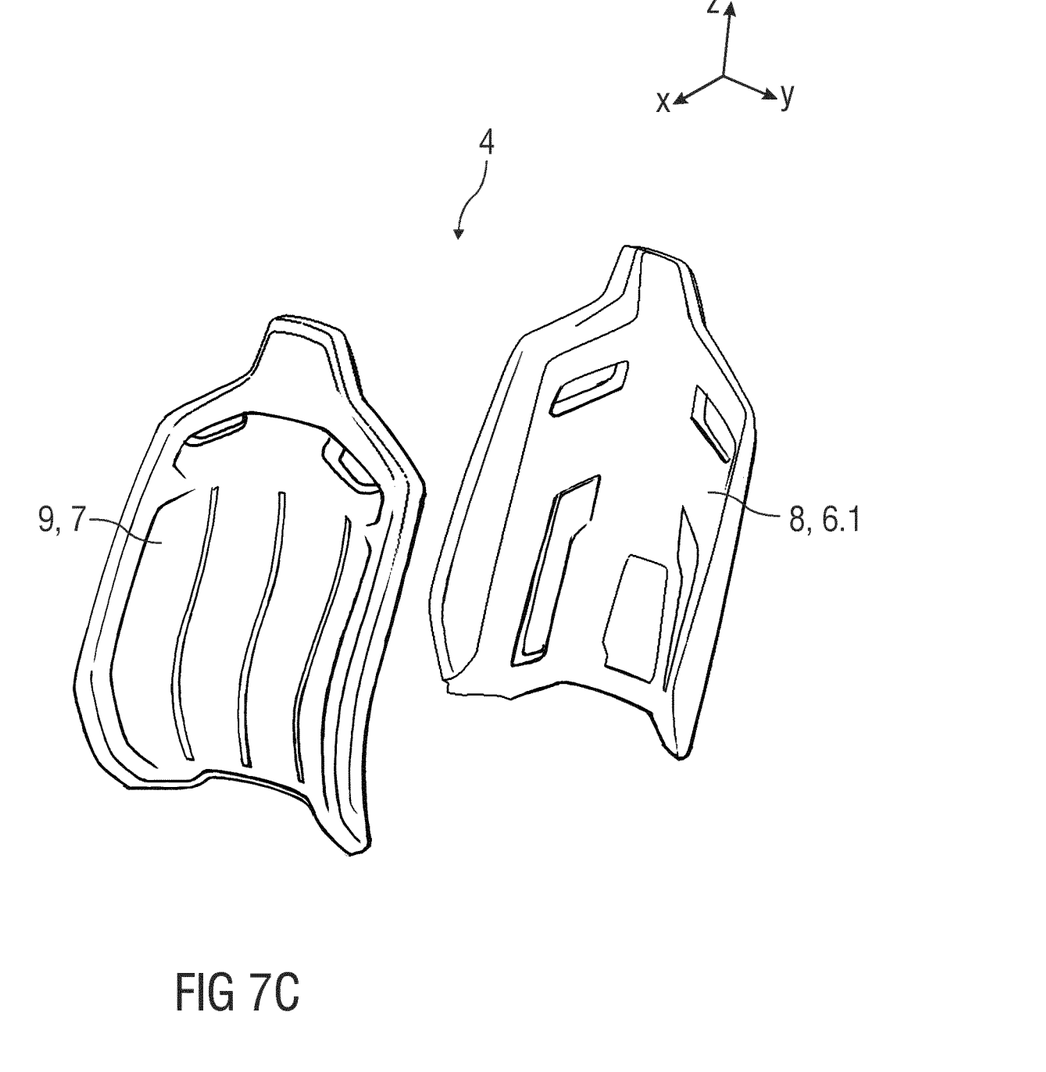
FIG. 7C shows in a perspective view an embodiment of a back-rest structure.

FIGS. 7A to 7C show in perspective views an embodiment of a vehicle seat 1, a back-rest structure and a seat pan structure.

In particular, FIG. 7A shows a whole vehicle seat 1 comprising a seating surface assembly 2. The seat 1 comprises at least a seat pan 3 and a back-rest 4. Optionally additional, the seat 1 comprises a headrest 5. For example, the back-rest 4 is adjustable relatively to the seat pan 3. In particular, the back-rest 4 is pivotable coupled to the seat pan 3 in a pivot axis. For example, the seating surface element 7 may comprise internal or integrated notches or channels to provide additional suspension and resilient characteristics. Internal or integrated structures may be combined with foam elements 11.

FIG. 7B shows an embodiment of a seat pan structure. The support structure 6.1 comprises a front portion 6.5 and a rear portion 6.6 which are each coupled to the lateral portions 6.2. For instance, the support structure 6.1 is formed as a one-piece part, wherein the front, rear and lateral portions 6.2, 6.5, 6.6 are configured as continuous side portions. The front and rear portions 6.5, 6.6 are extending upwards from the base portion 6.4. For example, the front portion 6.5 and the rear portion 6.6 each comprises a flexible suspension portion 6.3 having a retaining channel 6.3.1 and a tube portion 6.3.2 which is arranged in the retaining channel 6.3.1. For example, the retaining channel 6.3.1 of each rear, front and lateral portion 6.6, 6.5, 6.2 is configured as a continuous running channel in which a one-piece tube or bladder element comprising tube portions 6.3.2 is arranged. Thereby, a manufacturing and assembly of the support structure 6.1 is simplified. The seating surface element 7 is fixed around a perimeter 6.3.3 of the support structure 6.1. For example, the seating surface element 7 is fixed around a perimeter 6.3.3 of each front, rear and lateral portion 6.5, 6.6, 6.2. For example, the support structure 6.1 comprises a number of reinforcement elements 10. The reinforcement elements 10 are, for example, reinforcement bridges or pillars extending from the base portion 6.4. For example, the reinforcement elements 10 are support elements such as reinforcement ribs, reinforcement arches and/or support columns or the like. A plurality of reinforcement elements 10 can be combined together. For example, a reinforcement structure comprises a number of reinforcement elements 10 supporting at least the seating surface element 7 in any direction when force is applied. The reinforcement structure can be made of one-piece, e.g. by injection molding, and/or a number of pre-manufactured reinforcement elements 10 can be connected together. The reinforcement elements 10 are arranged between the flexible suspension portions 6.3 and the base portion 6.4. For example, the reinforcement elements 10 are configured as standing flanges allowing controlled rates of the flexible suspension portions 6.3 for fore and aft as well as side to side deflection and tuning compression for ingress and egress. The reinforcement elements 10 support the flexible suspension portions 6.3 along an inner peripheral surface of the support structure 6.1.

FIG. 7C shows a back-rest structure having a back panel shell 8 and a cushion panel 9. For example, the back panel shell 8 can be configured as a former described support structure 6.1 and the cushion panel 9 can be configured as a former described seating surface element 7. For example, the seating surface element 7 and/or the back cushion panel 9 may comprise internal or integrated notches or channels to provide additional suspension and resilient characteristics. Internal or integrated structures may be combined with foam elements 11.

Figure 8:
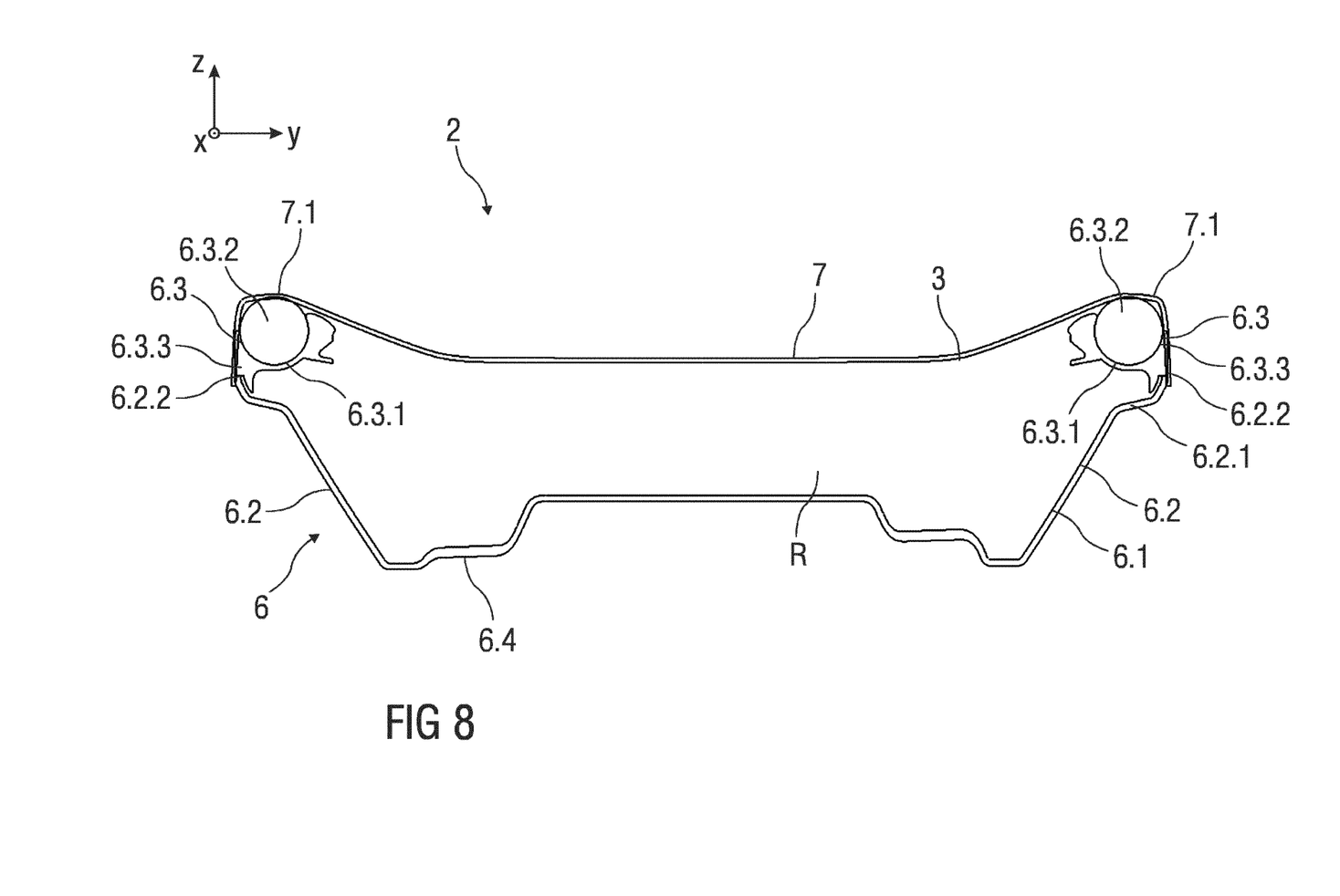
FIG. 8 shows an embodiment of a seating surface assembly.

FIG. 8 shows an embodiment of a seating surface assembly 2. The seating surface assembly 2 comprises a seating surface element 7 which is arranged on the lightweight cushion suspension 6. For example, the support structure 6.1 is substantially tub-shaped. In the shown embodiment, a support structure 6.1 is substantially w-shaped. The support structure 6.1 comprises at least lateral portions 6.2 extending from a base portion 6.4. The lateral portions 6.2 comprise flexible suspension portions 6.3 configured as border which provide bending and compression behavior. A seating surface element 7 is attached to the border in tension providing distribution and deflection via a hammock behavior on the border. In the shown embodiment the flexible suspension portions 6.3, in particular its retaining channels 6.3.1 are separate elements which are arranged on upper ends 6.2.1 of the lateral portions 6.2.

Figure 9:
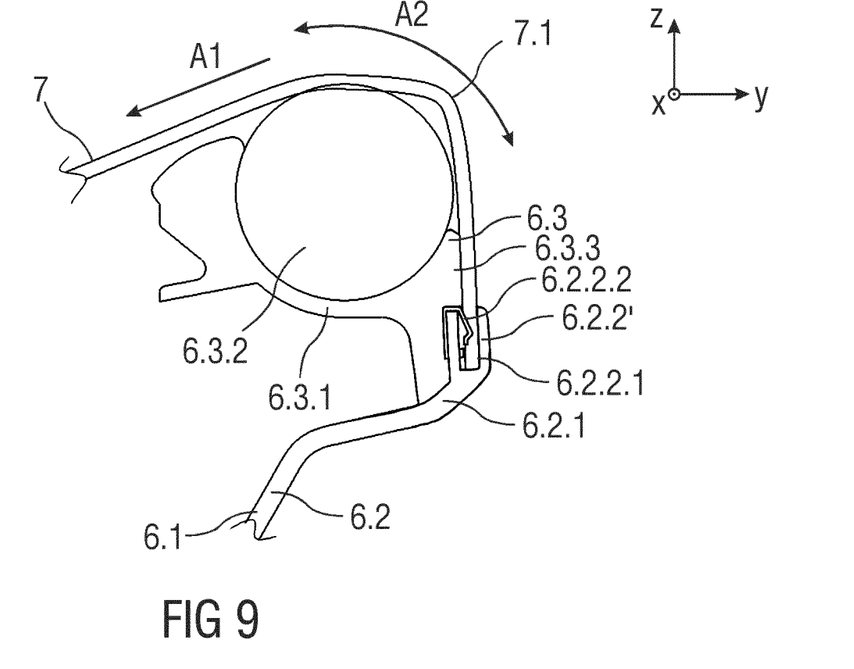
FIG. 9 shows an embodiment of a seating surface assembly comprising a support structure with an attachment device.

FIG. 9 shows an embodiment of a seating surface assembly 2 comprising a support structure 6.1 with an attachment device having at least an attachment area 6.2.2'. Shown is an enlarged view of one of the flexible suspension portions 6.3 of the support structure 6.1. The arrow A1 shows a possible force put on the seating surface element 7, for instance by an occupant taking a seat, wherein the flexible suspension portion 6.3 deflects in an inward direction. When the passenger leaves the seat 1, the flexible suspension portions 6.3 take back the initial position P1, so deflecting into a counter direction as shown by the arrow A1. The arrow A2 shows possible bending directions of the flexible suspension portion 6.3 and/or the tube portions 6.3.2. In particular, the flexible suspension portion 6.3 is bendable in the transverse direction of the seat 1. The attachment area 6.2.2' comprises an attachment channel 6.2.2.1 for retaining an end of the bent portion 7.1 of the seating surface element 7. Further, the attachment channel 6.2.2.1 comprises an attachment clip 6.2.2.2 to fasten the end of the bent portion 7.1 within the attachment channel 6.2.2.1.

Figure 10:
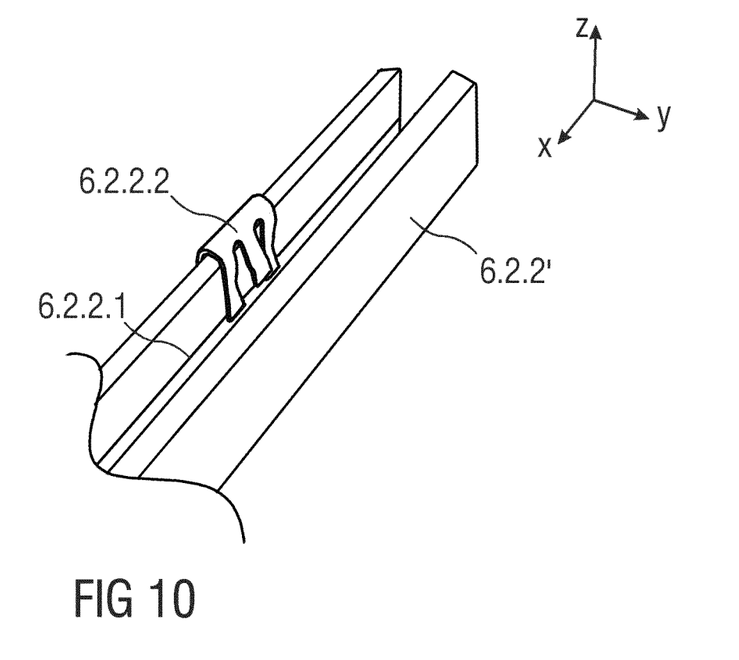
FIG. 10 shows an embodiment of the attachment device of the support structure of the seating surface assembly according to FIG. 9.

FIG. 10 shows an embodiment of the attachment device of the support structure 6.1 of the seating surface assembly 2 according to FIG. 9. The attachment channel 6.2.2.1 may be a continuous channel provided on upper ends 6.2.1 of the lateral portions 6.2, the front portion 6.5 and the rear portion 6.6 of the support structure 6.1. The flexible suspension portion 6.3 is arranged and fastened on an inner side of the attachment channel 6.2.2.1.

Figure 11:
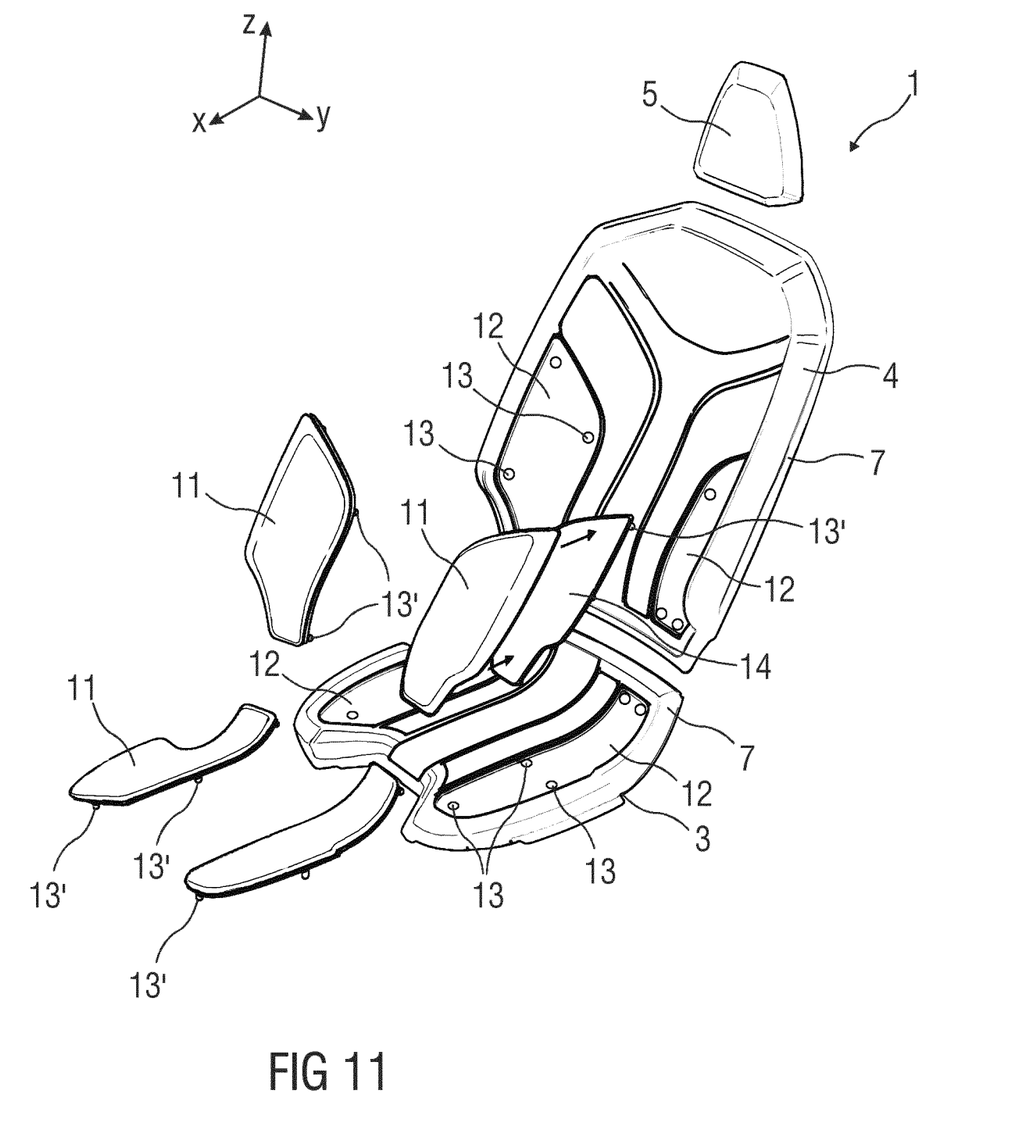
FIG. 11 shows schematically an exploded view of a vehicle seat comprising a seat pan seating surface assembly and a back-rest seating surface assembly.

FIG. 11 shows schematically an embodiment of an exploded view of a vehicle seat 1 comprising a seat pan seating surface assembly and a back-rest seating surface assembly, wherein only the corresponding seating surface elements 7 of each of the seat pan 3 and the back-rest 4 are shown. Additionally optionally, the headrest 5 can comprise a seating surface element 7 as well. Moreover, additional foam elements 11, such as bolster and/or pads and/or inserts, are shown. The additional foam elements 11 as shown are detachable elements which can be added to the seating surface element 7 of the back-rest 4 and to the seating surface element 7 of the seat pan 2 when desired. In another embodiment, the foam elements 11 are fixedly attached to the corresponding seating surface element 7. For example, the corresponding seating surface element 7 comprises respective retaining sections 12. Each retaining section 12 can be configured as one of an integrated recess, channel, notch, cavity, gap or groove. A number, shape and size, e.g. depth, width and/or length, of the retaining sections 12 are variable depending on a desired number, shape and size of the foam elements 11. Furthermore, the foam elements 11 can be exchanged for different foam elements 11 comprising different colors and/or materials and/or sizes for different occupants. For example, different sized foam elements 11 can individually fit to different occupant size. The foam elements 11 can comprise different profiles for small, medium and large sized occupants for better fit and comfort.

For example, the number of foam elements 11 per seating surface element 7 may be attached to the A-surface formed by the plastic seating surface element 7 via a removable clip and/or snap-in attachment or adhesive. For example, each seating surface element 7, in particular the respective retaining section 12, comprises a number of attachment elements 13 and each of the foam elements 11 comprises corresponding attachment elements 13'. The attachment elements 13, as shown, are attachment holes, notches, slots or the like. The attachment elements 13' are corresponding bolts, pins, clips or the like. A reverse variant is also possible. Furthermore, a number of additional plastic substrate elements 14 is provided in the shown removable option. The additional plastic substrate 14 can be optionally added between a respective foam element 11 and a respective seating surface element 7. The additional plastic substrate element 14 is configured as insert and/or pad and/or layer or the like. The additional plastic substrate element 14 supports the foam element 11. The plastic substrate element 14 can be adhered, fixedly attached or detachable attached to the foam element 11. The plastic substrate element 14 can comprise attachment elements 13 and/or 13'. The foam element 11 is made of weather-proof material, such as closed cell foam, e.g. EVA foam and/or molded foam.

LIST OF REFERENCES 1 seat
2 seating surface assembly
3 seat pan
4 back-rest
5 headrest
6 lightweight cushion suspension
6.1 support structure
6.2 lateral portion
6.2.1 upper end
6.2.2, 6.2.2' attachment area
6.2.2.1 attachment channel
6.2.2.2 attachment clip
6.3 flexible suspension portion
6.3.1 retaining channel
6.3.2 tube portion
6.3.3 perimeter
6.4 base portion
6.5 front portion
6.6 rear portion
7 seating surface element
7.1 bent portion
8 back panel shell
9 panel
10 reinforcement element
11 foam element
12 retaining section
13, 13' attachment element
14 substrate element
A1, A2 arrow
P1 initial position
P2 hammocking position
P3 egress and ingress position
R recess
T one-piece element
x longitudinal axis
y transverse axis
z vertical axis

The invention claimed is:

1. A cushion suspension for a vehicle seat, comprising:
a one-piece support structure comprising a substantially tub-shaped profile and at least two lateral portions, wherein each of the lateral portions comprises a flexible suspension portion and a flexible tube,
wherein each flexible suspension portion comprises a flexible retaining channel and wherein the flexible tube is arranged in the retaining channel, and
wherein the retaining channel extends below the flexible tube perpendicular from the corresponding lateral portion.

2. The cushion suspension according to claim 1, wherein each of the flexible suspension portions is formed at an upper end of the corresponding lateral portion.

3. The cushion suspension according to claim 1, wherein each flexible suspension portion extends substantially perpendicular from the corresponding lateral portion.

4. The cushion suspension according to claim 1, wherein the flexible tube is filled with a medium.

5. The cushion suspension according to claim 4, wherein the flexible tube is configured to be adjusted by modifying a quantity of the medium.

6. The cushion suspension according to claim 1, wherein the support structure comprises a front portion and a rear portion which are each coupled to the lateral portions.

7. The cushion suspension according to claim 6, wherein the flexible suspension portion is part of both the front portion and the rear portion each comprising the retaining channel and the tube arranged in the retaining channel.

8. The cushion suspension according to claim 1, wherein the retaining channel of each rear, front and lateral portion are configured as a continuous running channel in which the tube is arranged.

9. The cushion suspension according to claim 1, wherein each lateral portion comprises at least an attachment area to attach a seating surface element to the support structure.

10. The cushion suspension according to claim 1, wherein the tube is configured as one-piece element.

11. A seating surface assembly for a vehicle seat, comprising at least:
the cushion suspension according to claim 1, and
a seating surface element which is fixed around a perimeter of the support structure.

12. The seating surface assembly of claim 11, wherein the seating surface element is fixed at least around a perimeter of each lateral portion of the support structure.

13. The seating surface assembly according to claim 11, wherein the seating surface element is made of plastic material, including a thermoplastic material.

14. The seating surface assembly according to claim 11, wherein the seating surface element is a pre-formed part.

15. The seating surface assembly according to claim 11, wherein the seating surface element is fastened to the support structure substantially in tension.

16. A cushion suspension for a vehicle seat, comprising:
a support structure comprising a substantially tub-shaped profile having at least two lateral portions formed therein,
wherein each of the lateral portions comprises a flexible retaining channel formed on an end portion of the lateral portion and a flexible tube arranged in the retaining channel.

* * * * *